(12) United States Patent
Davidson et al.

(10) Patent No.: US 7,907,533 B2
(45) Date of Patent: Mar. 15, 2011

(54) METHODS, SYSTEMS, AND COMPUTER PROGRAM PRODUCTS FOR PERFORMING IP LINK PROVING USING HEARTBEAT MESSAGES

(75) Inventors: Mark E. Davidson, Chapel Hill, NC (US); Mark E. Kanode, Apex, NC (US); Jeffrey A. Craig, Durham, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 180 days.

(21) Appl. No.: 11/946,607

(22) Filed: Nov. 28, 2007

(65) Prior Publication Data

US 2009/0135723 A1  May 28, 2009

(51) Int. Cl.
*G01R 31/08* (2006.01)
(52) U.S. Cl. .......... 370/241; 370/248; 370/252
(58) Field of Classification Search .......... None
See application file for complete search history.

(56) References Cited

U.S. PATENT DOCUMENTS

| | | | |
|---|---|---|---|
| 6,668,051 B1 * | 12/2003 | Ashdown et al. | 379/221.08 |
| 6,983,324 B1 * | 1/2006 | Block et al. | 709/228 |
| 7,006,433 B1 | 2/2006 | Dantu et al. | |
| 7,277,954 B1 * | 10/2007 | Stewart et al. | 709/230 |
| 7,353,259 B1 * | 4/2008 | Bakke et al. | 709/208 |
| 7,535,900 B2 * | 5/2009 | Shenoi | 370/389 |
| 7,539,502 B2 * | 5/2009 | Lovell, Jr. | 455/466 |
| 7,577,090 B2 * | 8/2009 | Xu et al. | 370/219 |
| 2004/0264671 A1 | 12/2004 | Lamberton et al. | |
| 2005/0074026 A1 * | 4/2005 | Soncodi et al. | 370/465 |
| 2006/0153202 A1 * | 7/2006 | Dantu et al. | 370/395.52 |
| 2008/0049639 A1 * | 2/2008 | Wiley et al. | 370/252 |

OTHER PUBLICATIONS

Notification of Transmittal of the International Search Report and the Written Opinion of the International Searching Authority, fo the Declaration for International Application No. PCT/US2008/084989 (May 26, 2009).
Siddiqui et al., "SCTP Multihoming Support for Handcuffs across Heterogeneous Networks," Proceedings of the 4th Annual Communication Networks and Services Research Conference (CNSR'06), pp. 1-8 (May 2006).
Stewart, "Steam Control Transmission Protocol," RFC 4960, pp. 1-153 (Sep. 2007).
Morneault et al., "Signaling System 7 (SS7) Message Transfer Part 3 (MTP3)—User Adaptation Layer (M3UA)," RFC 4666, pp. 1-116 (Sep. 2006).
George et al., "Signaling System 7 (SS7) Message Transfer Part 2 (MTP2)—User Peer-to-Peer Adaptation Layer (M2PA)," RFC 4165, pp. 1-50 (Sep. 2005).

(Continued)

*Primary Examiner* — Chi H Pham
*Assistant Examiner* — Kouroush Mohebbi
(74) *Attorney, Agent, or Firm* — Jenkins, Wilson, Taylor & Hunt, P.A.

(57) ABSTRACT

According to one aspect, the subject matter described herein comprises methods, systems, and computer program products for performing IP link proving using heartbeat messages. The method includes transmitting a plurality of heartbeat messages over an IP communications link. A transmission parameter of the plurality of heartbeat messages is varied and a plurality of heartbeat acknowledgement messages corresponding to at least a subset of the plurality of heartbeat messages is received. A measure of processing capabilities of the IP communications link is determined based on the transmission parameters and the heartbeat acknowledgement messages.

23 Claims, 13 Drawing Sheets

OTHER PUBLICATIONS

Loughney et al., "Signalling Connection Control Part User Adaptation Layer (SUA)," RFC 3868, pp. 1-123 (Oct. 2004).

"SCTP Multihoming," SCTP for Beginners, Section 5, pp. 1-2 (Copyright 2001-2003).

Rosenberg et al., "SIP: Session Initiation Protocol," RFC 3261, pp. 1-252 (Jun. 2002).

"Signalling Connection Control Part Formats and Codes," International Telecommunication Union, Q.713 (Mar. 2001).

Davis, "Link Proving," Alcatel, p. 31 (Mar. 29, 2000).

"Telcordia Technologies Specification for Signaling System No. 7," GR-246-CORE, Issue 1, Chapter T1.111.3, pp. 13-15 (Dec. 1994).

* cited by examiner

METHODS, SYSTEMS, AND COMPUTER PROGRAM PRODUCTS FOR PERFORMING IP LINK PROVING USING HEARTBEAT MESSAGES

TECHNICAL FIELD

The subject matter described herein relates to performing link proving in a communications network. More particularly, the subject matter described herein relates to methods, systems, and computer program products for performing IP link proving using heartbeat messages.

BACKGROUND

In communications networks including multiple nodes, it may be desirable to ensure a link connecting two nodes is capable of carrying a desired amount of traffic. This process is referred to as "link proving" and may be performed before a link is brought into service by exchanging link proving messages between two nodes for the purpose of link proving. For example, in a Signaling System No. 7 (SS7) network, link proving may be performed by transmitting and receiving status indication normal/emergency signaling unit (SIN/SIE) messages between two SS7 nodes.

During an SS7 link proving period, SINs are continuously transmitted over the link in both directions (SIEs are used when a shorter proving period is desired). SINs are transmitted at the full bandwidth of the SS7 link being proven for a predetermined link proving period. For example, Bellcore standard (GR-246-CORE) specifies a proving period of 2.3 seconds for a 56 kb/s DS0 link. A determination of the capabilities of an SS7 link may be made by examining information contained in these SINs. For example, SINs carry Level 2 information, such as a cyclic redundancy check (CRC) checksum for verifying the integrity of received messages. A CRC checksum is included in SINs because Level 2 SS7 signaling nodes do not perform hardware layer data integrity verification upon receipt of an SIN. Therefore, corrupt or incomplete SINs may be received at layer 2 based on specifications laid out, for example, in Bellcore standard GR-246-CORE.

However, as network operators increasingly move to Internet protocol based networks which must interoperate with conventional SS7 standards, translating SS7 link proving constructs to the IP domain has been problematic. One problem associated with performing link proving for IP links is that IP protocols, such as M3UA and SUA, are effectively shielded from receiving and detecting missing, corrupt, or incomplete packets necessary for performing link proving, because the underlying network and transport protocols correct data integrity error, and the transport protocol requests retransmission of lost packets.

The Internet engineering task force (IETF), via the signaling transport (SIGTRAN) working group, has specified several protocol standards for communicating SS7 signaling messages over an IP network, including message transfer part 3 user adaptation (M3UA), message transfer part 2 user peer-to-peer adaptation (M2PA), and signaling connection control part user application (SUA). SUA, M3UA, and M2PA are adaptation layer protocols which sit on top of stream control transmission protocol (SCTP) and IP, which each perform data integrity checks on packets (chunks in SCTP parlance) before passing them up to the M3UA or SUA layer. SCTP is a reliable connection-oriented transport protocol operating over IP. SCTP resides in the transport layer and handles communication among programs in a network. This includes accepting data from the application layer and repackaging it so that it may be passed on to the network layer. In addition, the transport layer will ensure the data arrives correctly on the other end using sequence numbers and retransmission timeouts.

For example, upon receiving an M3UA chunk, hardware implementing the IP protocol may examine each packet using a checksum included in the packet for corrupt or incomplete packets. This IP layer may then discard the bad packets which is detected at the SCTP layer by checking for gaps in the sequence numbers of arriving packets. A similar data integrity checked is performed at the SCTP layer. The SCTP layer passes the corrected packets or chunks to the adaptation layer. As a result, packets received by the M3UA layer contain no errors. Because the adaptation layer carries the SS7 message traffic and that traffic is corrected, conventional link proving that relies on detecting errors in received FISUs cannot be performed.

Additionally, conventional IP link proving methods typically include exchanging a limited number of messages in a short period of time in order to bring the link into service as quickly as possible. For example, Heartbeat messages may be sent and corresponding Heartbeat Acknowledgement messages may be received in order to measure a round trip time (RTT) for the link. If the measured RTT is within acceptable limits, the link may be proved and immediately brought into service.

One problem associated with conventional methods for IP link proving, including IP link proving, is that unstable or poorly performing links may be brought into service. For example, link performance may be satisfactory for low message volumes and small message sizes, but may be unsatisfactory for higher message volumes and larger message sizes. Because typical message volume for live traffic traversing an IP link greatly exceeds the number of messages used for conventional link proving, conventional link proving methods may inadequately indicate link performance.

For example, an IP link may be rated at 1.5 Mb/s (i.e. expected to carry 1.5 Mb/s message volume). However, for various reasons, the link may only be capable of operating at 1 Mb/s. During conventional link proving, only a fraction of the link capacity is used, and therefore the link may be proved and brought into service. For purposes of illustration, assume that conventional link proving methods utilize 0.1 Mb/s of the 1.5 Mb/s link (operating suboptimally at 1 Mb/s) as described above. Upon proving the link it is brought into service, and live traffic may be placed on the link at its expected capacity of 1.5 Mb/s. However, because the link is operating suboptimally, the link may become congested and/or fail. Packets may then be routed around the failed link and a restart procedure may begin. During the restart, conventional link proving may again be performed at low message volumes and low transmission rates. Accordingly, the link may be proved again. However, because the message volume associated with conventional link proving may not adequately assess link performance at live traffic volumes, an accurate assessment of link performance may not be achieved. Therefore again, the link may fail when message volume exceeds the links ability to handle it and an undesirable process of cycling the link between active and inactive status is repeated.

Another problem associated with conventional methods for performing IP link proving is that conventional IP link proving does not individually prove paths within a multi-homed SCTP association. For example, a primary path in a multi-homed SCTP association may be capable of operating at a first capacity and a second path in the SCTP association may be capable of operating at a second capacity, where the first capacity is different from the second capacity. Conventional methods for link proving may only exchange link proving messages over the first path in the link, leaving the performance of the second association either unproven or inadequately proven.

Another problem associated with conventional methods for performing IP link proving is that no monitoring of link performance is performed after a link has been proved and brought into service. For example, in a conventional network, a link may be proved at its final rated capacity and then, subsequently, its performance may deteriorate. This deterioration may go undetected by system operators until a link failure occurs in a conventional network because no performance monitoring is performance after the link is brought into service.

Accordingly, there exists a need for improved methods, systems, and computer program products for performing IP link proving using heartbeat messages.

SUMMARY

The subject matter described herein comprises methods, systems, and computer program products for performing Internet Protocol (IP) link proving using heartbeat messages. One method includes transmitting a plurality of heartbeat messages over an IP communications link. A transmission parameter of the plurality of heartbeat messages is varied and a plurality of heartbeat acknowledgement messages corresponding to at least a subset of the plurality of heartbeat messages is received. A measure of the processing capabilities of the IP communications link is determined based on the transmission parameters and the heartbeat acknowledgement messages.

According to another aspect, a method for proving a multi-homed IP communications link is disclosed. The method includes transmitting a first set of heartbeat messages over a first communications path within a multi-homed stream control transmission protocol (SCTP) association. A first set of heartbeat acknowledgement messages corresponding to at least a subset of the first set of heartbeat messages is received. A measure of processing capabilities of the first communications path is determined based on the first set of heartbeat acknowledgement messages. Similarly, a second set of heartbeat messages is transmitted over a second communications path within the multi-homed SCTP association and a second set of heartbeat acknowledgement messages corresponding to at least a subset of the second set of heartbeat messages is received. A measure of processing capabilities of the second communications path is determined based on the second set of heartbeat acknowledgment messages.

According to another aspect, a signaling gateway for proving an IP link is disclosed. The signaling gateway includes a heartbeat message configuration interface for varying at least one transmission parameter of heartbeat message to be transmitted over an IP communications link. An IP communications function is configured to transmit the plurality of heartbeat messages over the IP link, wherein the transmission parameters in the heartbeat messages vary according to settings received via the configuration interface. An IP link proving function is configured to determine the processing capabilities of the IP based link based on the heartbeat messages and the heartbeat acknowledgement messages.

The subject matter described herein may be implemented in hardware, software, firmware, or any combination thereof. As such, the terms "function" or "module" as used herein refer to hardware, software, and/or firmware for implementing the feature being described. In exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
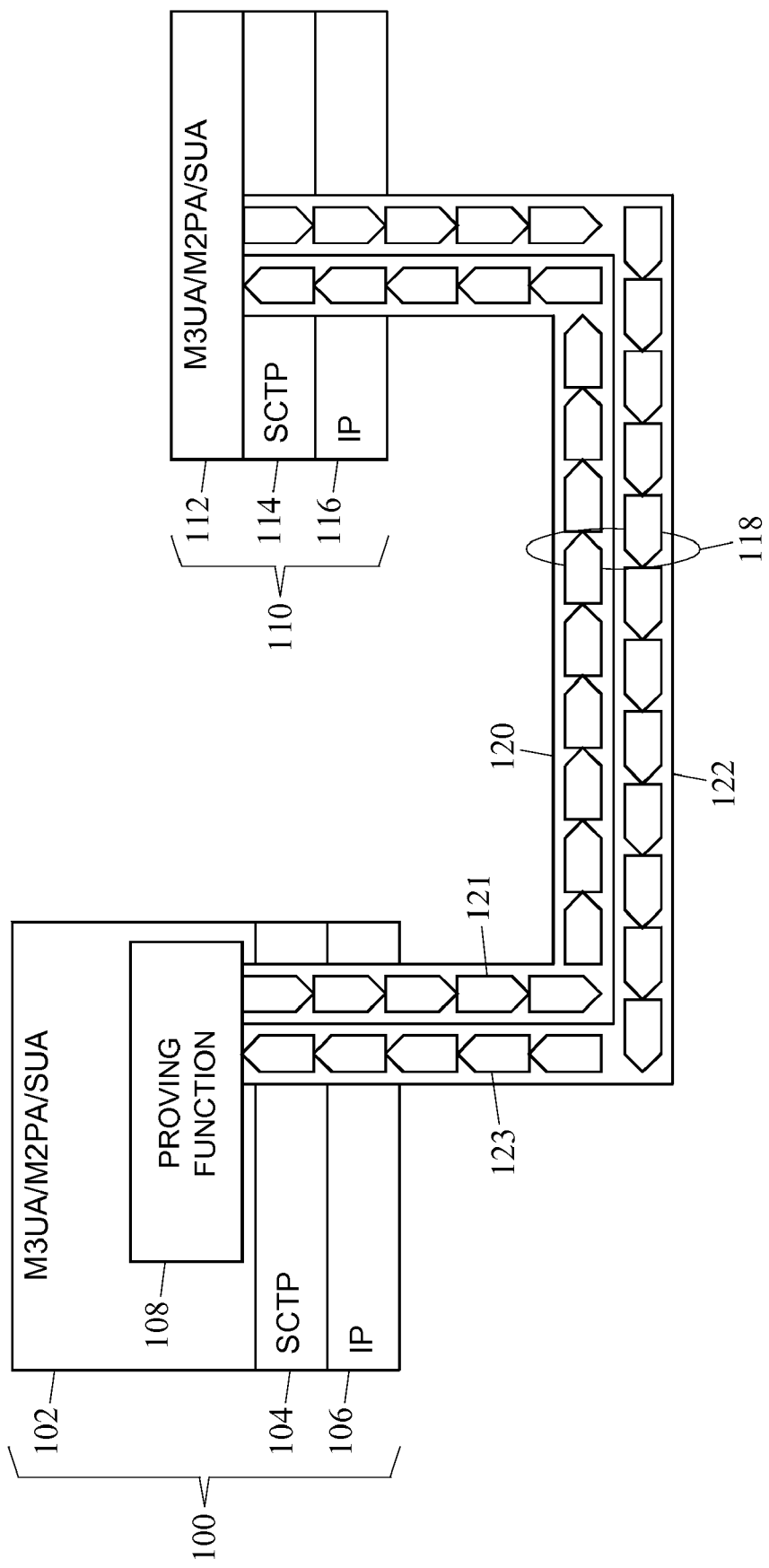
FIG. 1 is a block diagram illustrating an exemplary IP link for performing link proving according to an embodiment of the subject matter described herein.

FIG. 1 is a block diagram illustrating an exemplary network for performing link proving for an IP link according to an embodiment of the subject matter described herein. Referring to FIG. 1, IP link proving may be performed by exchanging exemplary heartbeat messages over an IP link between a first software entity and a second software entity, where the first and second software entities reside on nodes connected to different ends of an IP signaling link. Each software entity may implement a protocol stack for IP communications. For example, protocol stack 100 may include a plurality of protocol layers for performing various functions associated with sending and receiving messages in an IP communications network. In one embodiment, protocol stack 100 may include M3UA/M2PA/SUA layer 102, SCTP layer 104, and IP layer 106. Messages received by protocol stack 100 may be processed by each layer 102-106 included within stack 100. Thus, IP layer 106 may perform IP functions corresponding to the network layer in the OSI model, SCTP layer 104, SCTP layer 104 may perform SCTP functions corresponding to the transport layer in the OSI model, and M3UA/M2PA/SUA layer 102 may perform functions corresponding to M3UA, M2PA, or SUA, depending on which adaptation layer protocol is implemented.

M3UA/M2PA/SUA layer 102 may further include a link proving function 108 for performing IP link proving using heartbeat messages according to the subject matter described herein. Destination protocol stack 110 may also include an M3UA/M2PA/SUA layer 112, an SCTP layer 114, and an IP layer 116 in a similar configuration as that described above with respect to stack 100. Protocol stacks 102 and 110 may include computer-executable instructions stored on a computer-readable medium that, when executed by a processor, may perform the steps described below.

For example, stack 100 may be executed by any suitable IP networking node, including but not limited to a signaling gateway (SG), an application server process (ASP), and a signaling end point (SEP). An ASP may be an Internet protocol (IP) based networking entity that is connected to a SG via IP network, such as the Internet. A SEP may be an SS7 network node that is connected to a SG via an SS7 network, such as the public switched telephone network (PSTN). It is appreciated that any suitable IP link may be used without departing from the scope of the subject matter described herein. This may include any suitable network for transporting IP packets, such as 10 Mbps Ethernet, Gigabit Ethernet, and 802.11a-n wireless IP links. Similarly, any suitable SS7 network for implementing the subject matter described herein may include, but is not limited to, 64 kb/s PSTN links, asynchronous transfer mode (ATM), SONET, and ISDN links. In the example shown in FIG. 1, stacks 100 and 110 may be connected via link 118 which includes a 1.5 Mb capacity link.

Proving function 108 may begin link proving by transmitting a plurality of heartbeat messages 120 to stack 110 and examining the corresponding plurality of heartbeat acknowledgement messages 122 generated by M3UA/M2PA/SUA layer 112. As described in RFC 4666, a heartbeat message is optionally used to ensure that M3UA peers are still available to each other. The payload of a heartbeat message is defined by the sender and may include, for example, a timestamp, sequence number, and checksum. The payload of a heartbeat message is not processed by a recipient of a heartbeat message. Rather, the recipient of a heartbeat message must return a heartbeat acknowledgement message that includes all the parameters of the received heartbeat message without any change.

In the embodiment shown in FIG. 1, heartbeat (BEAT) messages, such as BEAT message 121, may initially be sent at a rate corresponding to an expected maximum bandwidth associated with link 118. Upon receiving BEAT message 121, M3UA/M2PA/SUA layer 112 automatically responds by generating a heartbeat_ack (BEAT ACK) message, such as BEAT ACK message 123, that includes modified header information and a payload identical to the payload in the received BEAT message. Thus, according to M3UA specifications described in RFC 4666, a function receiving a BEAT message automatically generates and transmits to the sender a BEAT ACK message that includes the same payload received in the BEAT message. The presently disclosed subject matter includes taking advantage of this aspect of BEAT and BEAT ACK message behavior by including various information within BEAT message payloads that may be used to determine the health of a particular IP link.

BEAT messages transmitted by stack 100 for link proving may include a timestamp indicating the time the message was transmitted, a sequence number indicating the transmission order of packets in a packet stream, the text string "PROVING" for indicating that a BEAT message is associated with link proving, pad bytes for ensuring a consistent packet size, and a checksum for determining the integrity of information included in the BEAT message.

Optional information that may be included in a BEAT message is defined by the sending node. This information may include, as described above, a Heartbeat Sequence Number and a Timestamp among other parameters. The receiver of a BEAT message (i.e. receiving M3UA layer 112) does not process this information as it is only of significance to the sender. Rather, a BEAT ACK message is sent in response to a received BEAT message, where the BEAT ACK includes all parameters included in the received BEAT message without any changes. Stack 100 may send M3UA BEAT messages in conjunction with stream control transmission protocol (SCTP) and IP, where SCTP is an end-to-end, connection-oriented protocol for transporting data in independent sequenced streams in a multi-homed environment. IP is a data-oriented protocol used for communicating data across a packet switched network.

Additionally, it is appreciated that the messages transmitted by stack 100 are not limited to M3UA BEAT messages. In other embodiments, stack 100 may transmit a plurality of one of non-M3UA signaling system 7 over IP (SS7oIP) messages, session initiation protocol (SIP) messages, IP multimedia subsystem (IMS) messages, or next generation network (NGN) messages without departing from the scope of the subject matter described herein. For purposes of illustration, exemplary methods for performing IP link proving will be described in greater detail below using M3UA BEAT messages.

Figure 2:
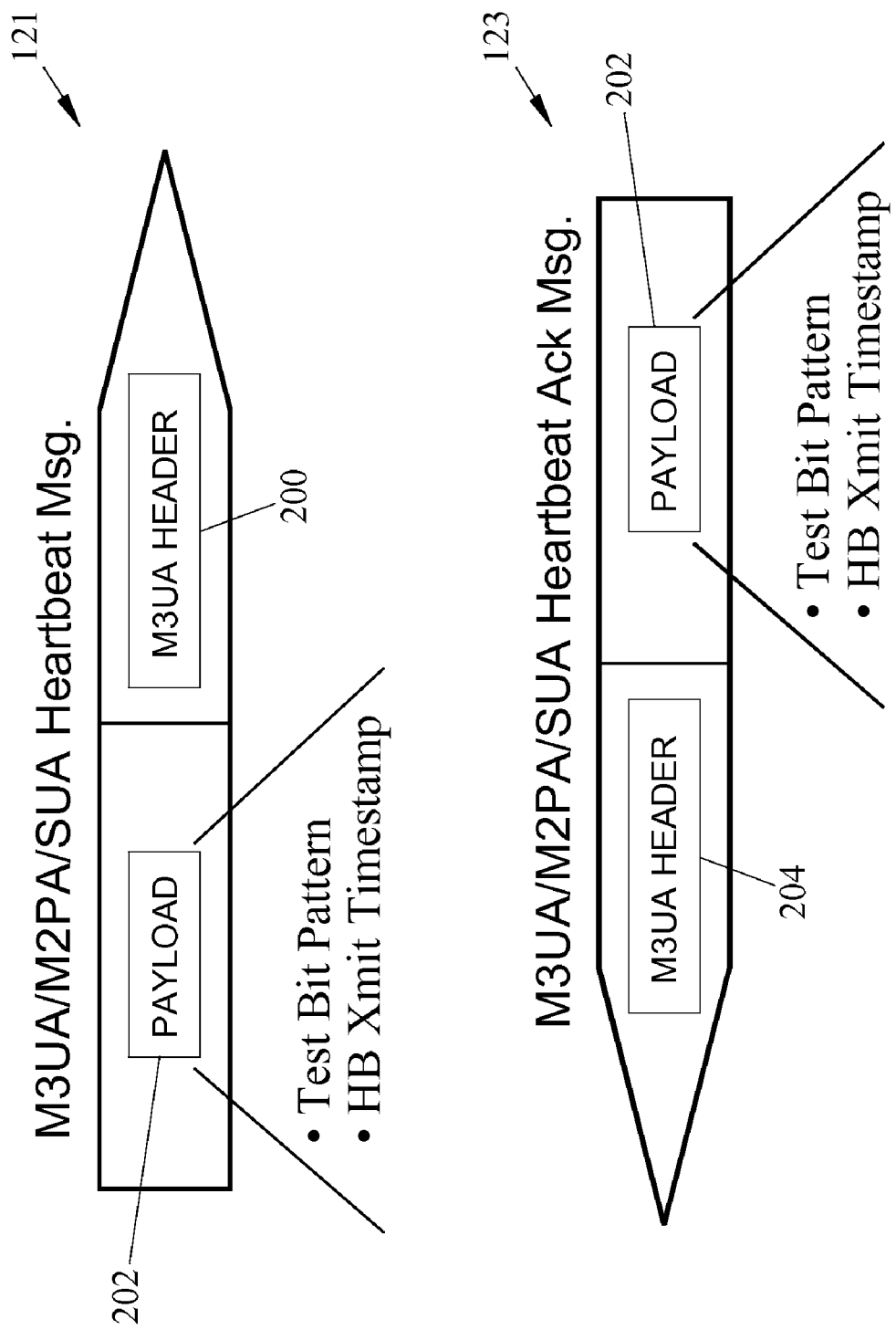
FIG. 2 is a block diagram of exemplary heartbeat message and heartbeat acknowledge message formats for performing IP link proving according to an embodiment of the subject matter described herein.

FIG. 2 is a diagram of exemplary heartbeat message and heartbeat acknowledge message formats for performing IP link proving according to an embodiment of the subject matter described herein. Referring to FIG. 2, exemplary M3UA BEAT message 121 may include an M3UA header portion for routing the packet to a network destination and a payload portion for storing optional information determined by a M3UA proving function. For example, exemplary BEAT message 121 may include header 200 that includes (one or more IP addresses) and payload 202 that includes a checksum, a timestamp, a sequence number, or other information that may be used to determine link performance.

Exemplary heartbeat Acknowledgement (BEAT ACK) message 123 may be automatically generated in response to receiving BEAT message 121. BEAT ACK message 123 may include a header portion 204 for routing the message back to the sender of BEAT message 121 and a payload portion 202 that is identical to payload 202 included in BEAT message 121. As mentioned above, no examination of payload 202 is performed by the recipient of BEAT message 121, and information included in payload 202 may be used to calculate, among other things, a RTT associated with the BEAT/BEAT ACK message pair. If the RTT exceeds a predetermined maximum threshold, the link may fail to be proved and a notification may be generated and sent to a system administrator.

Figure 3:
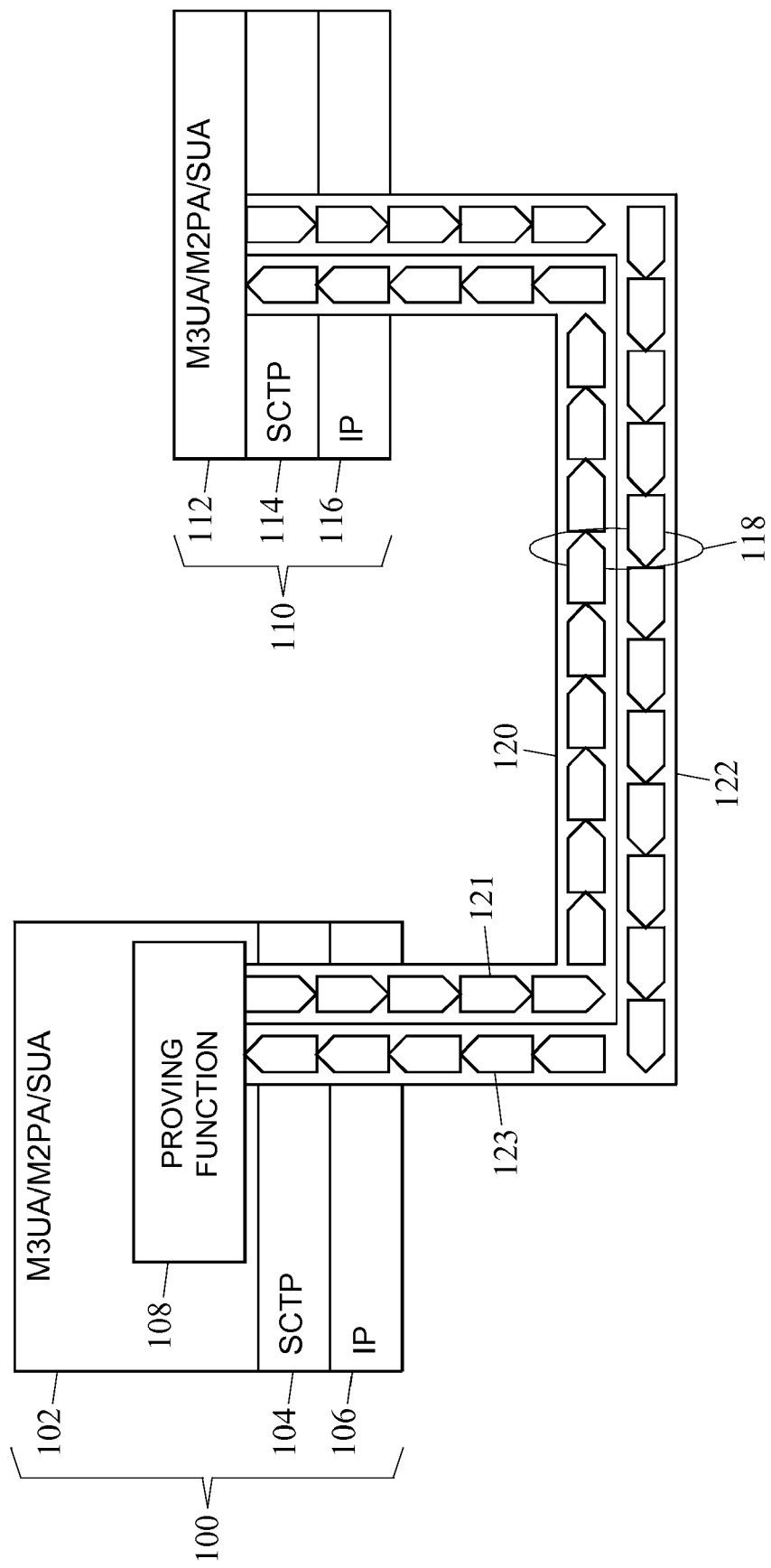
FIG. 3 is a block diagram illustrating an exemplary IP link for performing prove-at-best-rate (PBR) mode link proving according to an embodiment of the subject matter described herein.

FIG. 3 is a diagram illustrating an exemplary IP link for performing prove-at-best-rate (PBR) mode link proving according to an embodiment of the subject matter described herein. In FIG. 3, proving function 108 may be configured to operate in a "prove at best rate" (PBR) mode. In PBR mode, proving function 108 may initially attempt to prove link 118 at the expected maximum capacity and if link proving at the maximum rate fails, proving function 108 may attempt to prove the link at progressively lower throughputs until the highest provable throughput is determined. Alternatively, proving function 108 may initially attempt to prove link 118 at a predetermined minimum expected capacity and the link may be proved at progressively higher throughputs until the highest provable throughput is determined (i.e. the highest proved throughput before link proving fails). Upon successfully proving link 118, including proving link 118 at a lower throughput than its maximum rate capacity, link 118 may be brought into service at the proven rate or link 118 may not be brought into service until it is proven at the full rate. Additionally, proving function 108 may generate a notification indicating that link 118 was proven at a lower rate so that the user may take appropriate action.

For example, BEAT message stream 120 may include a 1.5 Mb/s message stream corresponding to the maximum rated capacity of link 118. For purposes of illustration, it is assumed in FIG. 3 that link proving fails at 1.5 Mb/s and therefore proving function 108 attempts to prove link 118 at a lower throughput. Continuing this example, link 118 may be proven at 1.4 Mb/s and brought into service at 1.4 Mb/s.

It is appreciated that in the embodiment illustrated in FIG. 3, link proving may be performed after the network node executing stack 100 is "up" but before it is "active". However, it is appreciated that link proving may also be performed after ASP 102 is both up and active. According to RFC 4666, three states are defined for the status of network entities, such as an AS. The "down" state indicates that the network entity is unavailable, and an AS begins in this state. A DOWN message may be used to indicate to a remote M3UA peer that the adaptation layer is not ready to receive data messages. Conversely, an UP message is used to indicate to a remote M3UA peer that the adaptation layer is ready to receive any messages that the ASP is configured to serve. For example, UP/UPACK message pair may be exchanged between SG 100 and ASP 102. The "inactive" state indicates that the application server is available but that no application traffic is active. Finally, the "active" state indicates that the application server is available and application traffic is active. An ACTIVE message may be sent by an ASP to indicate to a remote M3UA peer that it is ready to process signaling traffic for an application server. For example, ACTIVE/ACTIVEACK message pairs may be exchanged between SG 100 and ASP 102. Transitions between these states may be achieved by the exchange of appropriate messages between network entities as described above.

A link proving period may begin by sending heartbeat (BEAT) message stream 120 and awaiting acknowledgement message stream 122. During the link proving period, in order to allow the SCTP congestion window time to open gradually, M3UA/M2PA/SUA proving function 108 may delay sending further BEAT messages until user-defined and/or user-configurable conditions are met. For example, in one embodiment, M3UA/M2PA/SUA proving function 108 may send BEAT messages at a user-defined rate less than the maximum transmission rate for link 118, such as ten percent of expected message volume.

In the embodiment illustrated in FIG. 3, M3UA/M2PA/SUA proving function 108 may be configured to wait until a first BEAT ACK message is received before transmitting subsequent BEAT messages. Upon receiving a BEATACK, a round trip time (RTT) for the link may be determined based on an examination of the timestamps included in corresponding BEAT and BEATACK message pairs. For example, if a first BEAT message includes a timestamp of 00:00:00 (hr:min:sec) indicating that it was sent at 12 am, and a first BEATACK message is received at 00:00:01 indicating that it was received at 12 am and 1 second, then the round trip time for the link is 1 second. The initial determined RTT may then be used to determine an initial rate for sending further BEAT messages. In one embodiment, the initial rate for sending BEAT messages for the purpose of link proving may be that 1 BEAT message is sent per RTT. For example, using the 1 second RTT described above, an initial rate may include sending 1 BEAT message per second.

Depending on the embodiment for determining the initial link proving BEAT message rate, BEAT messages may be sent at the initial rate and incrementally increased or decreased thereafter. In FIG. 3, BEAT messages may be sent at a rate of 1 BEAT message per second. While waiting to receive corresponding BEATACK messages, M3UA/M2PA/SUA proving function 108 may receive an ACTIVE message from the destination protocol stack indicating that ASP 102 is available and application traffic is active. However, because an ACTIVE message is received during the link proving period, M3UA/M2PA/SUA proving function 100 may respond, for example, with an ERROR message indicating that the ACTIVE message was refused due to management blocking. In the example illustrated in FIG. 3, M3UA/M2PA/SUA proving function 100 may continue sending heartbeat messages at the initial rate and await receipt of any outstanding heartbeat acknowledgment messages.

The destination protocol stack may then transmit the remainder of BEATACK message stream 122 to M3UA/M2PA/SUA proving function 100 corresponding to BEAT messages stream 120. Based on information contained in these messages, SG 100 may increase the rate at which further BEATs are sent. The rate continues to increase until one of several conditions are met. One exemplary condition may include a determination that the rate of sending and receiving BEAT/BEATACK messages meets or exceeds a threshold rate, such as the transmission rate necessary for carrying the expected message volume for the link. Another exemplary condition may include the failure to receive one or more BEATACK messages corresponding to outstanding BEATs sent, or receiving BEATACKs after an unacceptably long delay. Each of these conditions may indicate link congestion and result in reducing the size of the SCTP congestion window and reducing the corresponding rate at which BEAT messages are sent.

Upon completion of link proving, M3UA/M2PA/SUA proving function 100 may receive an ACTIVE message indicating that application data may be transferred across the link. In this situation, M3UA/M2PA/SUA proving function 100 may respond be sending and ACTIVEACK message indicating an acknowledgment of active status.

Figure 4:
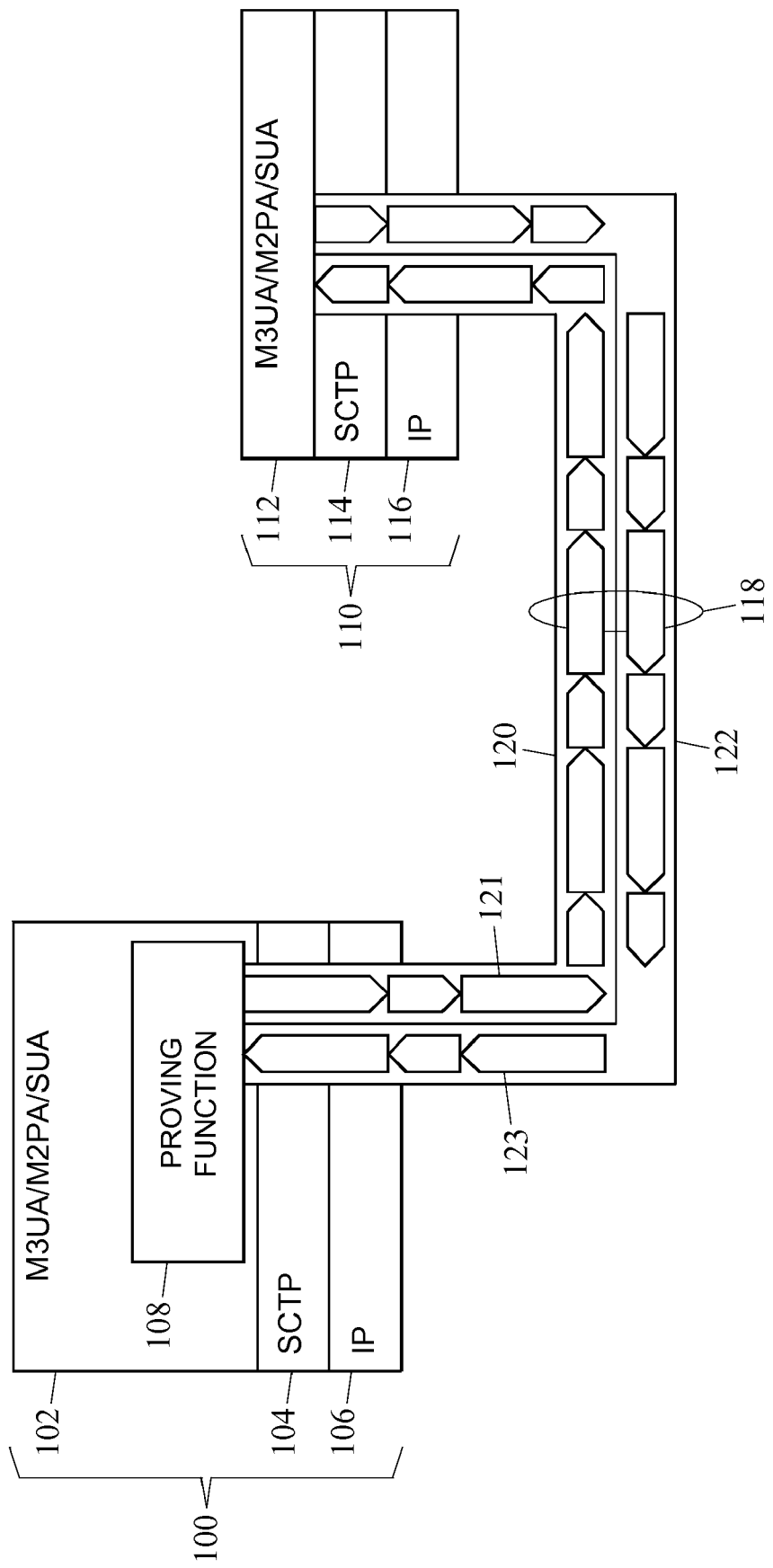
FIG. 4 is a block diagram illustrating an exemplary IP link for performing link proving using variable message sizes according to an embodiment of the subject matter described herein.

FIG. 4 is a diagram illustrating an exemplary IP link for performing link proving using variable message sizes according to an embodiment of the subject matter described herein. In FIG. 4, heartbeat message stream 120 may include varying sized payloads thereby allowing a system operator to determine link 118's sensitivity to different message sizes at different throughputs before bringing the link into service.

In one embodiment, proving function 108 may attempt to prove link 118 by generating message stream 120 that comprises a 1.5 Mb/s message stream containing 5000 byte payloads. Proving function 108 may then attempt to prove link 118 at by generating a 1.5 Mb/s message stream containing 300 byte payloads. Similarly, it is appreciated that any combination of message throughput and message size may be implemented for performing link proving without departing from the scope of the subject matter described herein.

Figure 5:
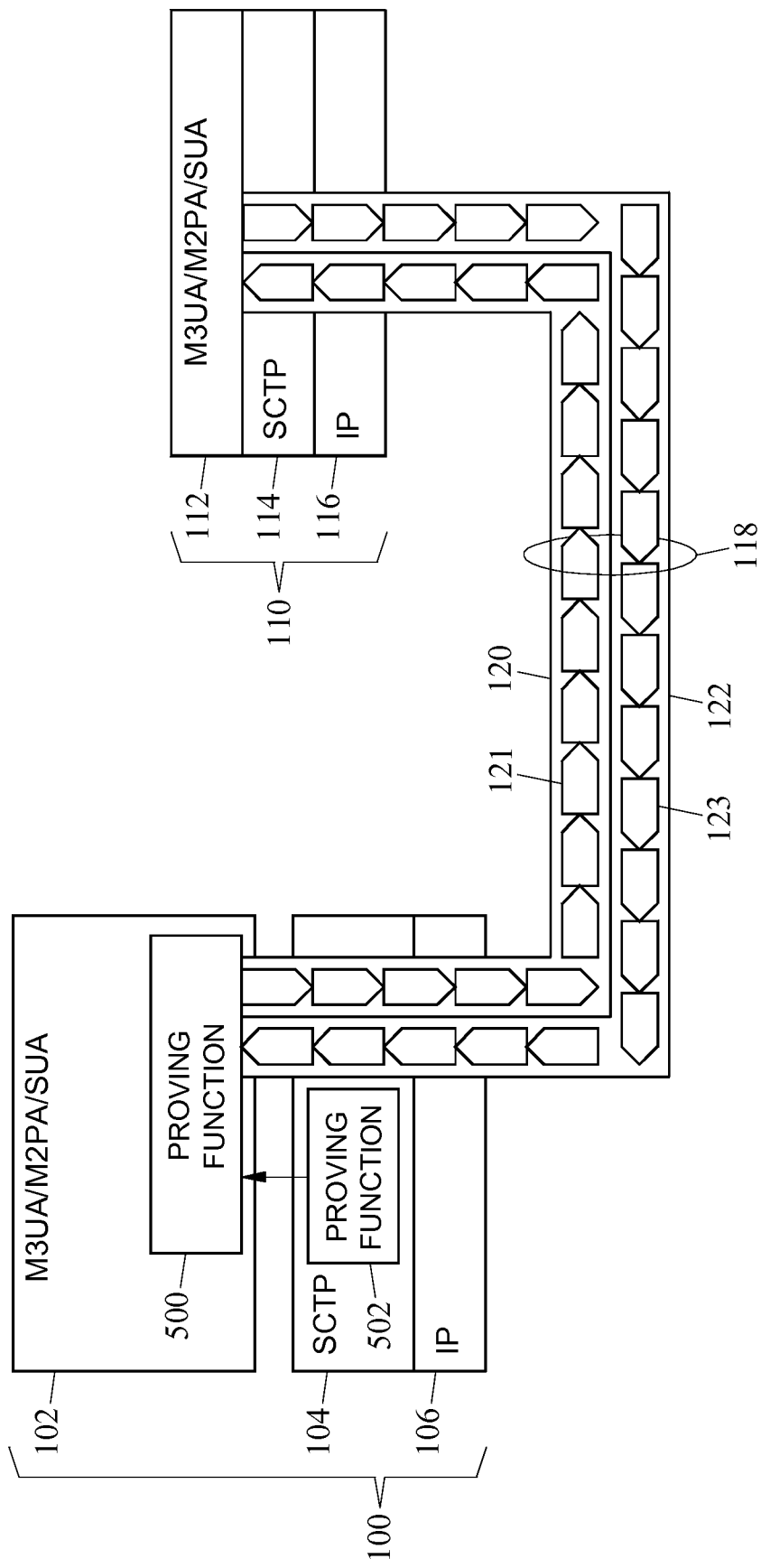
FIG. 5 is a block diagram illustrating an exemplary IP link for performing link proving that includes an SCTP layer proving function according to an embodiment of the subject matter described herein.

FIG. 5 is a block diagram illustrating an exemplary IP link for performing link proving that includes an SCTP layer proving function according to an embodiment of the subject matter described herein. In FIG. 5, SCTP layer 104 may include a link proving function 500 for communicating SCTP information to M3UA/M2PA/SUA proving function 108. SCTP proving function 500 may collect and report SCTP layer statistics to M3UA/M2PA/SUA proving function 108. For example, SCTP proving function 500 may collect and report a retransmitted message total, an average RTT, and a maximum RTT to M3UA/M2PA/SUA proving function 108.

Figure 6:
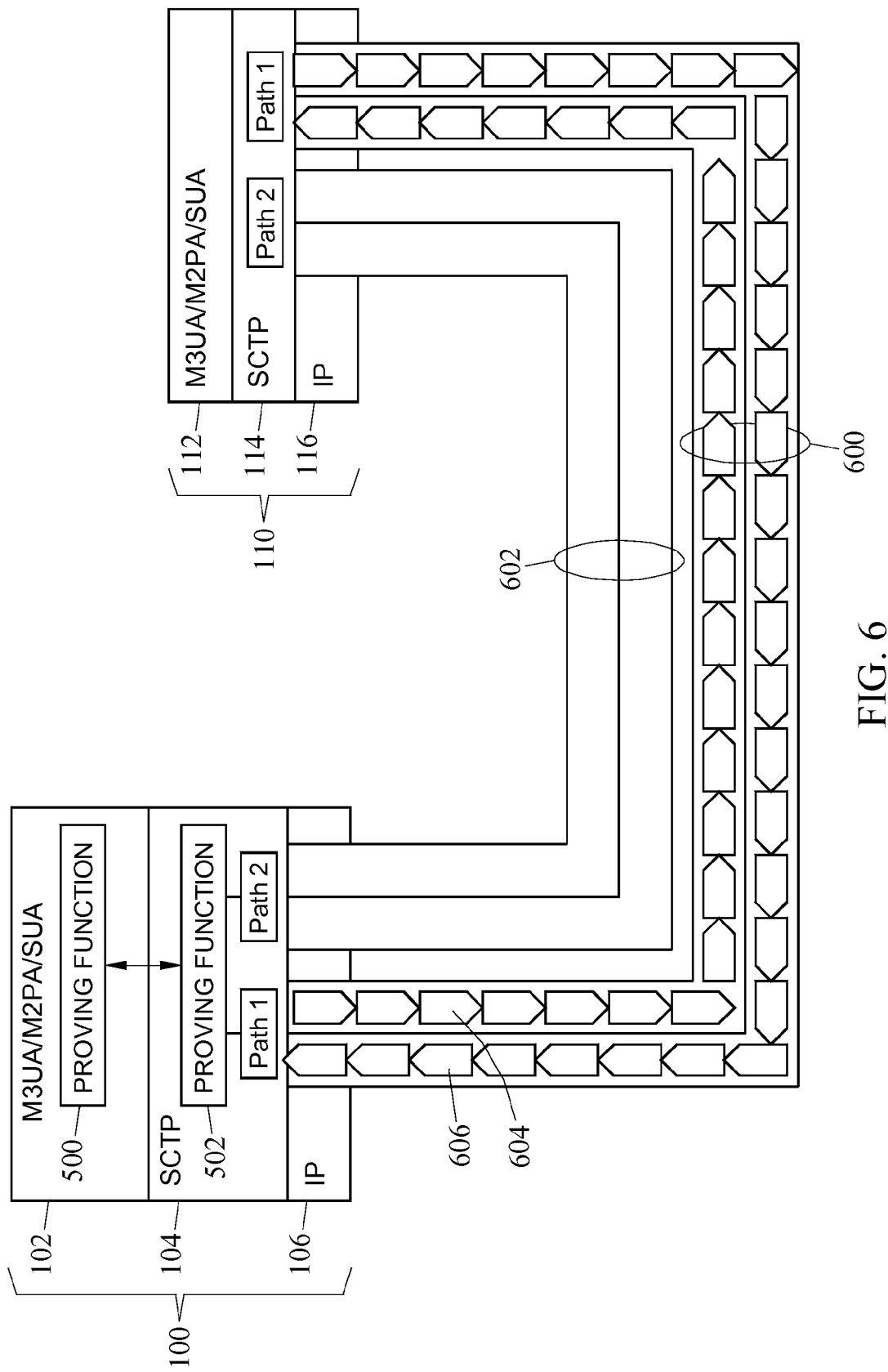
FIG. 6 is a block diagram illustrating an exemplary message flow for performing link proving in a multi-homed IP link according to an embodiment of the subject matter described herein.

FIG. 6 is a block diagram illustrating an exemplary message flow for performing link proving in a multi-homed IP link according to an embodiment of the subject matter described herein. In the embodiment shown in FIG. 6, IP link proving may be performed over a multi-homed link. Specifically, originating protocol stack 100 may be connected to destination protocol stack 110 via a first SCTP communications path 600 and a second SCTP communications path 602. Each of paths 600 and 602 may operate separately at a maximum rated capacity of 1.5 Mb/s and are both managed by SCTP layer 104.

As mentioned above, conventional methods for performing link proving in a multi-homed SCTP environment do not prove SCTP association paths individually. Rather, an SCTP layer typically transmits heartbeat messages over a preferred path and leaves the secondary path unproven. Therefore, as will be described in greater detail below, the subject matter disclosed herein provides for proving individual associations within a multi-homed environment.

For example, M3UA/M2PA/SUA proving function 500 may generate heartbeat message stream 604 addressed to a network identifier associated with path 602, such as an IP address. Path 602 may include a physical or logical communications link connected to a network interface card (NIC) that is identified by, for example, an IP address. The IP address assigned to path 602 uniquely identifies it from an IP address associated with path 600. Accordingly, by specifically addressing first heartbeat message stream 604 to path 602, link proving may be performed in a multi-homed environment on a path-by-path basis.

After proving path 602, M3UA/M2PA/SUA proving function 500 may also generate a second stream of heartbeat messages (not shown) addressed to a NIC associated with path 600. Similarly, SCTP layer 114 may receive the stream of heartbeat messages associated with the second path 600 and respond by transmitting a corresponding stream of heartbeat acknowledgement messages via path 600. In this way, alternate path 600 within a multi-homed SCTP association may be proved.

Figure 7:
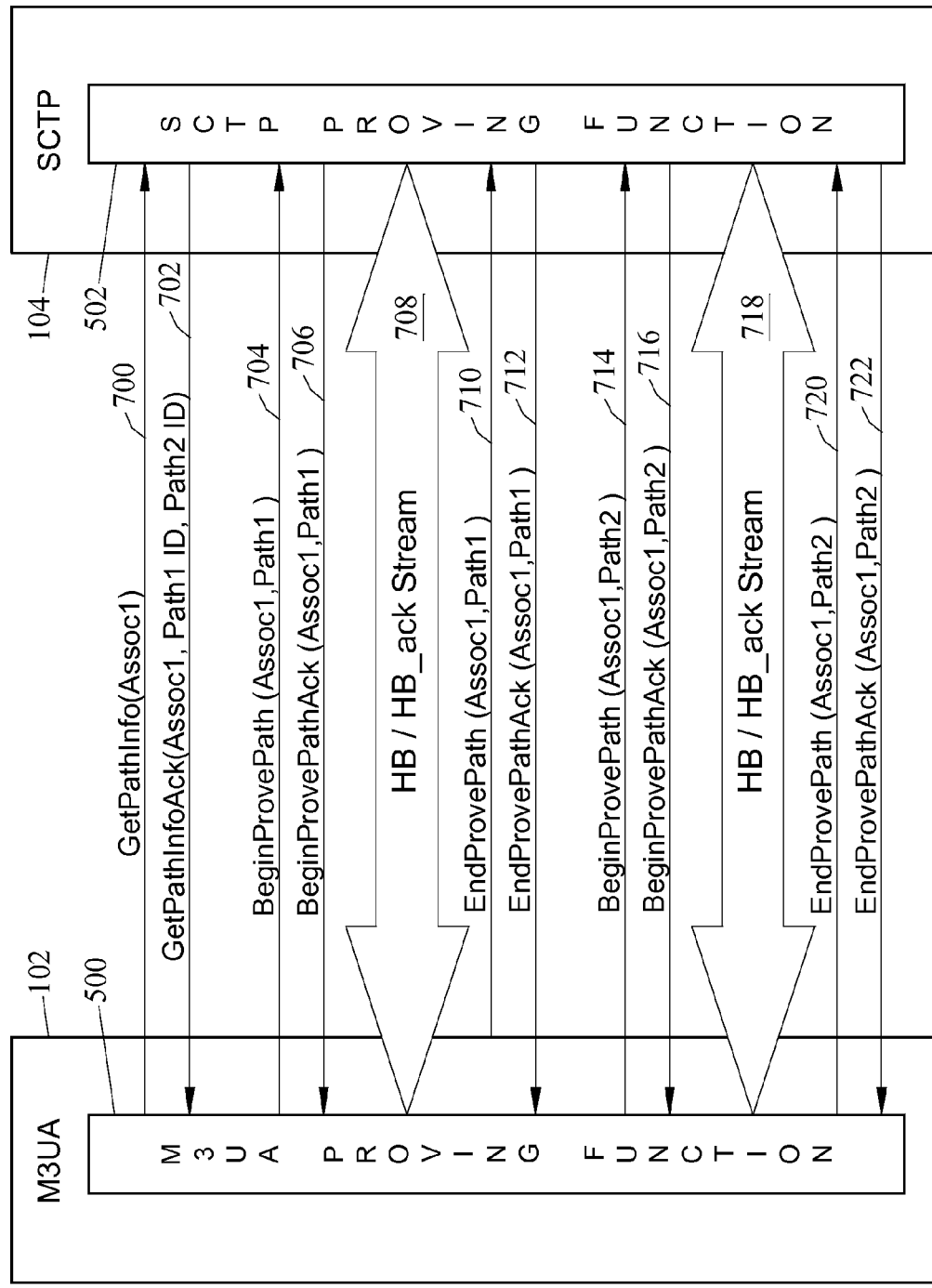
FIG. 7 is a message flow diagram illustrating an exemplary M3UA-SCTP handshake message sequence for performing IP link proving according to an embodiment of the subject matter described herein.

FIG. 7 is a message flow diagram illustrating an exemplary M3UA-SCTP handshake message sequence for performing IP link proving according to an embodiment of the subject matter described herein. In FIG. 7, M3UA/M2PA/SUA proving function 500 may send a GetPathInfo message 700 that includes an identifier associated with a first SCTP association to SCTP proving function 502 within protocol stack 100. In response, SCTP proving function 502 may generate a GetPathInfoAck message that includes the same association identifier included in message 700 and further includes one or more path identifiers corresponding to each path within a multi-homed SCTP association. In this example, the multi-homed association includes paths 600 and 602 as illustrated in FIG. 6. Returning to FIG. 7, a path is chosen by M3UA/M2PA/SUA proving function 500 and a BeginProvePath message 704 is transmitted to SCTP proving function 502 for proving path 602. In response, SCTP proving function 502 generates BeginProvePathAck message 706 that identifies the association and path belonging to path 602. Subsequently, a plurality of heartbeat messages are sent by M3UA/M2PA/SUA proving function 500 to SCTP layer 104 for delivery to destination protocol stack 110 and a corresponding stream of heartbeat_ack messages are received by SCTP layer 104 and passed to M3UA/M2PA/SUA layer proving function 500. The plurality of heartbeat and heartbeat_ack messages 708 are shown as a single two-way arrow for simplicity of illustration. However, it is appreciated that message stream 708 may include packets of varying sizes and or transmission rates in accordance with other aspects of the subject matter described herein. The completion of link proving path 602 may be indicated by the generation of an EndProvePath message. For example, M3UA/M2PA/SUA proving function 500 may generate EndProvePath message 710 that includes identifiers associated with the SCTP association and the path 602. In response, SCTP proving function 502 may return corresponding EndProvePathAck message 712 and a similar process may be initiated for proving a second path in the SCTP association.

For example, the process of proving path 600 may begin by sending BeginProvePath message 714 which is identical to BeginProvePath message 704 discussed above, except that BeginProvePath message 714 includes a path identifier associated with alternate path 600. In a similar manner, BeginProvePath message 714 is acknowledged with BeginProvePathAck message 716 and a message stream of BEAT and BEATACK messages 718 is exchanged. Upon completing the proving of path 600, EndProvePath and EndProvePathAck messages 720 and 722 are exchanged.

Figure 8:
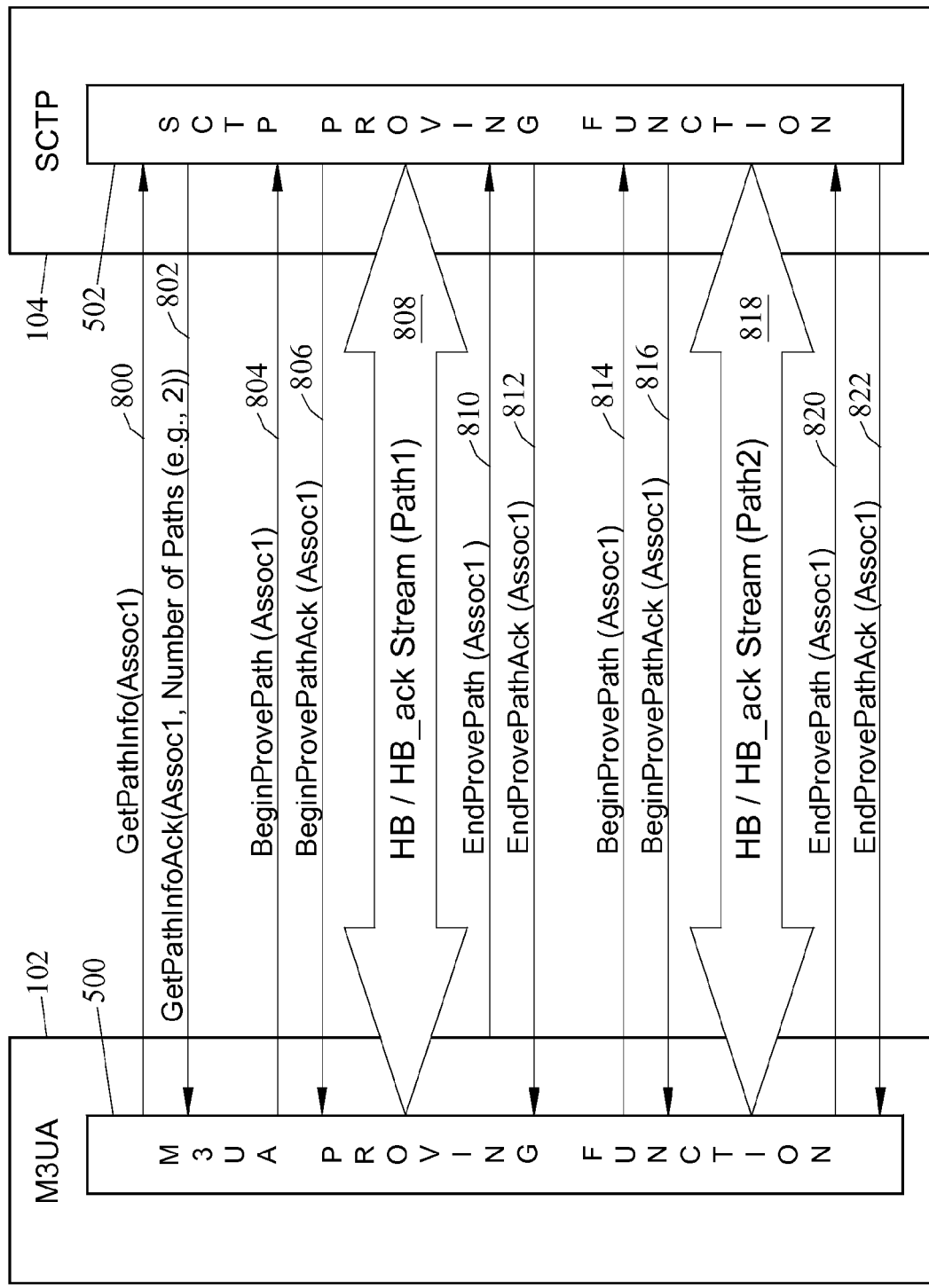
FIG. 8 is a message flow diagram illustrating an exemplary M3UA-SCTP handshake message sequence for performing IP link proving according to an embodiment of the subject matter described herein.

FIG. 8 is a message flow diagram illustrating an exemplary M3UA-SCTP handshake message sequence for performing IP link proving according to an embodiment of the subject matter described herein. In FIG. 8, M3UA/M2PA/SUA proving function 500 may send a GetPathInfo message 800 that includes an identifier associated with a first SCTP association to SCTP proving function 502 within protocol stack 100. In response, SCTP proving function 502 may generate GetPathInfoAck message 802 that includes the same association identifier included in message 800 and further includes a number indicating the number of paths within a multi-homed SCTP association. In this example, the multi-homed association includes two paths 600 and 602 as illustrated in FIG. 6. Returning to FIG. 8, BeginProvePath message 804 may be transmitted to SCTP proving function 502 for proving path 602 and, in response, SCTP proving function 502 generates BeginProvePathAck message 806. Subsequently, a plurality of BEAT and BEATACK messages may be exchanged by M3UA/M2PA/SUA proving function 500 and SCTP proving function 502 for proving the path 602. The plurality of heartbeat and heartbeat_ack messages 808 are shown as a single two-way arrow for simplicity of illustration. The completion of link proving for path 602 may be indicated by the generation of an EndProvePath message. For example, M3UA/

M2PA/SUA proving function 500 may generate EndProvePath message 810 that includes identifiers associated with the SCTP association and the path 602. In response, SCTP proving function 502 may return corresponding EndProvePathAck message 812 and a similar process may be initiated for proving a second path in the SCTP association.

Proving of the second path (i.e. path 600) may begin by sending BeginProvePath message 814 that includes a path identifier associated with the second path 600. In a similar manner to that described above, BeginProvePath message 814 may be acknowledged with BeginProvePathAck message 816 and a message stream of BEAT and BEATACK messages 818 may be exchanged for proving path 600. Upon completion of link proving for path 600, EndProvePath and EndProvePathAck messages 820 and 822 may be exchanged.

Figure 9:
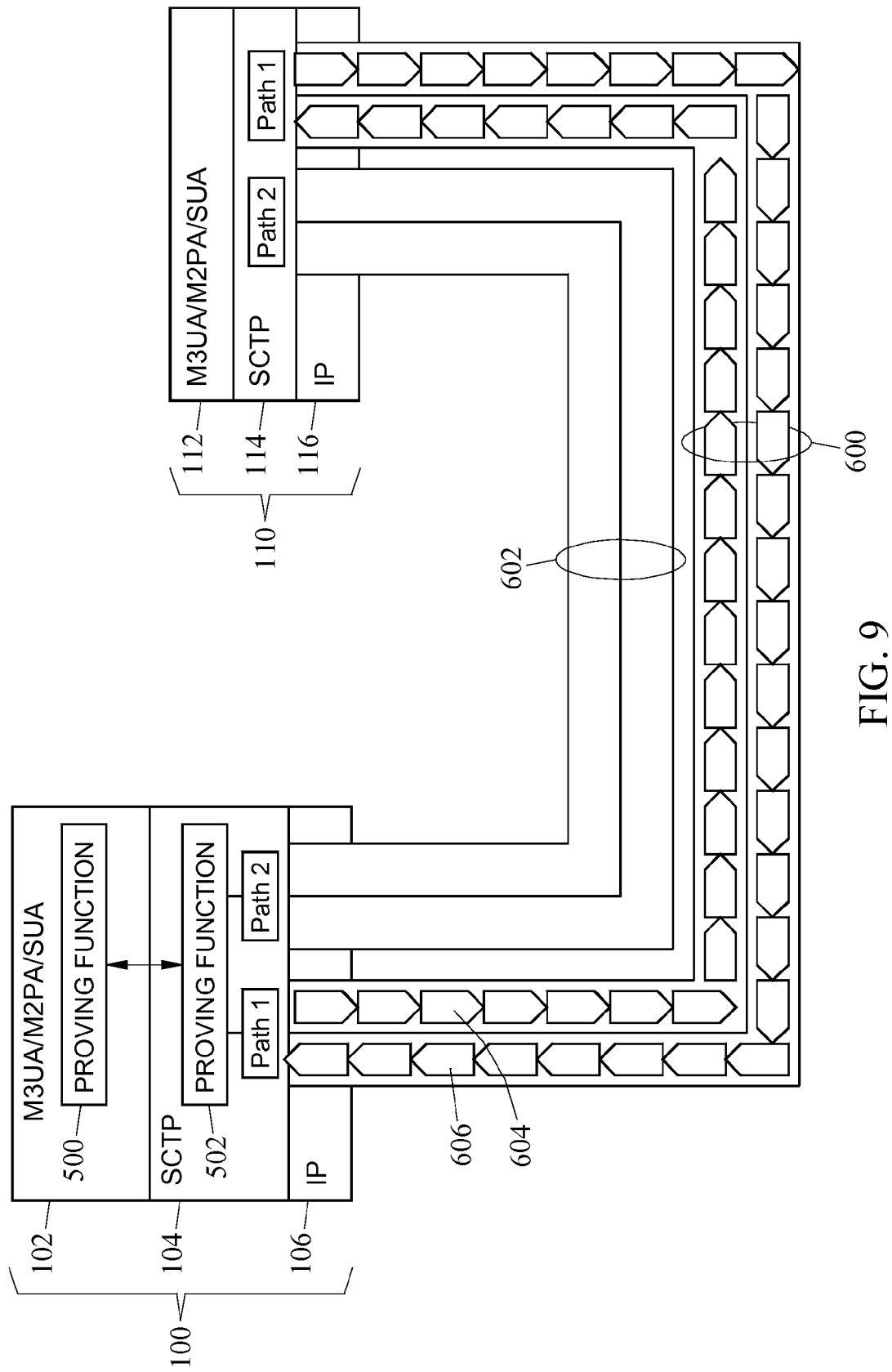
FIG. 9 is a message flow diagram illustrating an exemplary multi-homed IP link for performing per-path link proving according to an embodiment of the subject matter described herein.

FIG. 9 is a block diagram illustrating an exemplary multi-homed IP link for performing per-path link proving according to an embodiment of the subject matter described herein. In FIG. 9, SCTP proving function 502 may be configured to attempt to prove individual paths within a multi-homed SCTP association by redirecting BEAT messages to each path within the association upon determining that proving has been completed for a particular path. In this way, M3UA/M2PA/SUA proving function does not require knowledge of the paths within the SCTP association in order to effect path-specific proving, an embodiment of which is described above with respect to FIG. 6.

For example, M3UA/M2PA/SUA proving function may generate a stream of BEAT messages and pass them to SCTP proving function without specifying a particular path to be proved. Upon receiving the BEAT messages, SCTP proving function may determine a first path to prove and route all BEAT messages to that path. SCTP proving function may then be configured to signal M3UA/M2PA/SUA proving function that proving has been completed and to begin sending a second stream of BEAT messages. Without knowledge or control by M3UA/M2PA/SUA proving function, SCTP proving function may then route the second BEAT message stream via a second path and a second signal may be sent to M3UA/M2PA/SUA proving function upon successfully proving this path. This process may be repeated for each path within an SCTP association, thereby reducing the complexity required by M3UA/M2PA/SUA proving function.

Figure 10:
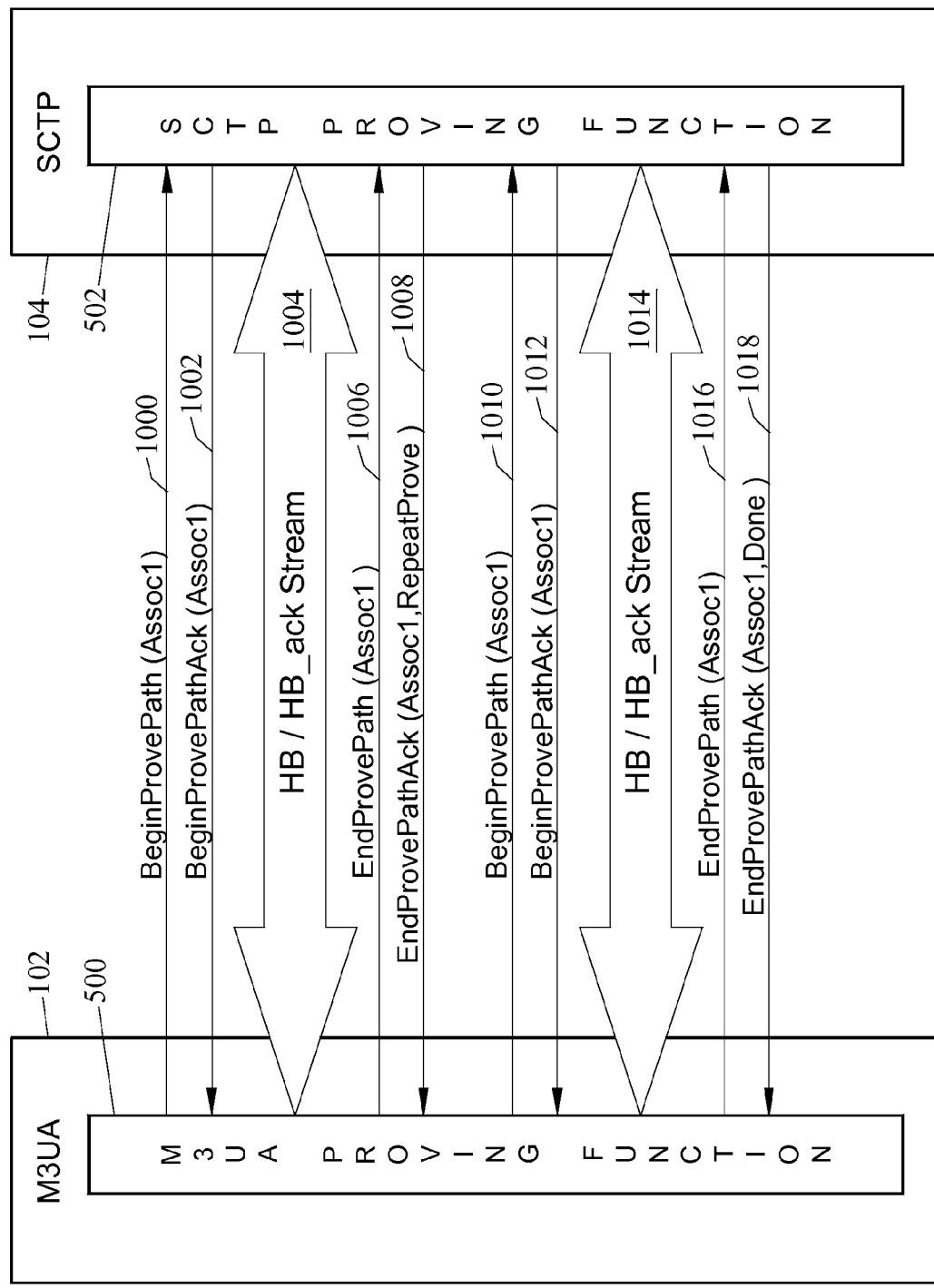
FIG. 10 is a block diagram illustrating an exemplary IP link for performing link proving according to an embodiment of the subject matter described herein.

FIG. 10 is a message flow diagram illustrating an exemplary IP link for performing link proving according to an embodiment of the subject matter described herein. In FIG. 10, M3UA/M2PA/SUA proving function 500 may initiate link proving by generating BeginProvePath message 1000. In contrast to BeginProvePath message 704 described above, BeginProvePathMessage 1000 does not include a path identifier and only includes an association identifier. Accordingly, M3UA/M2PA/SUA proving function does not require any knowledge of the particular characteristics of the multi-homed SCTP association and may leave that to SCTP layer 104. In response, SCTP proving function 502 may return BeginPathProveAck 1002 and a BEAT/BEATACK message stream may be exchanged between M3UA/M2PA/SUA layer 102 and SCTP layer 104. After a sufficient number of BEAT/BEATACK messages have been exchanged to prove a first path, SCTP proving function 502 may signal M3UA/M2PA/SUA proving function 500 and a second set of link proving messages may be generated for proving a second path within the SCTP association. For example, SCTP proving function 502 may include a RepeatProve parameter within EndProvePathAck message 1008 that signals M3UA/M2PA/SUA proving function 500 to generate another BeginProvePath message, such as BeginProvePath message 1010. As described above, a BEAT/BEATACK message stream 1014 may be exchanged and upon completion of link proving, M3UA/M2PA/SUA proving function 500 may generate EndProvePath message 1016. If SCTP proving function 502 determines that there are no more paths within the association to be proved, SCTP proving function 502 may include a DONE parameter in EndProvePath message 1018.

Figure 11:
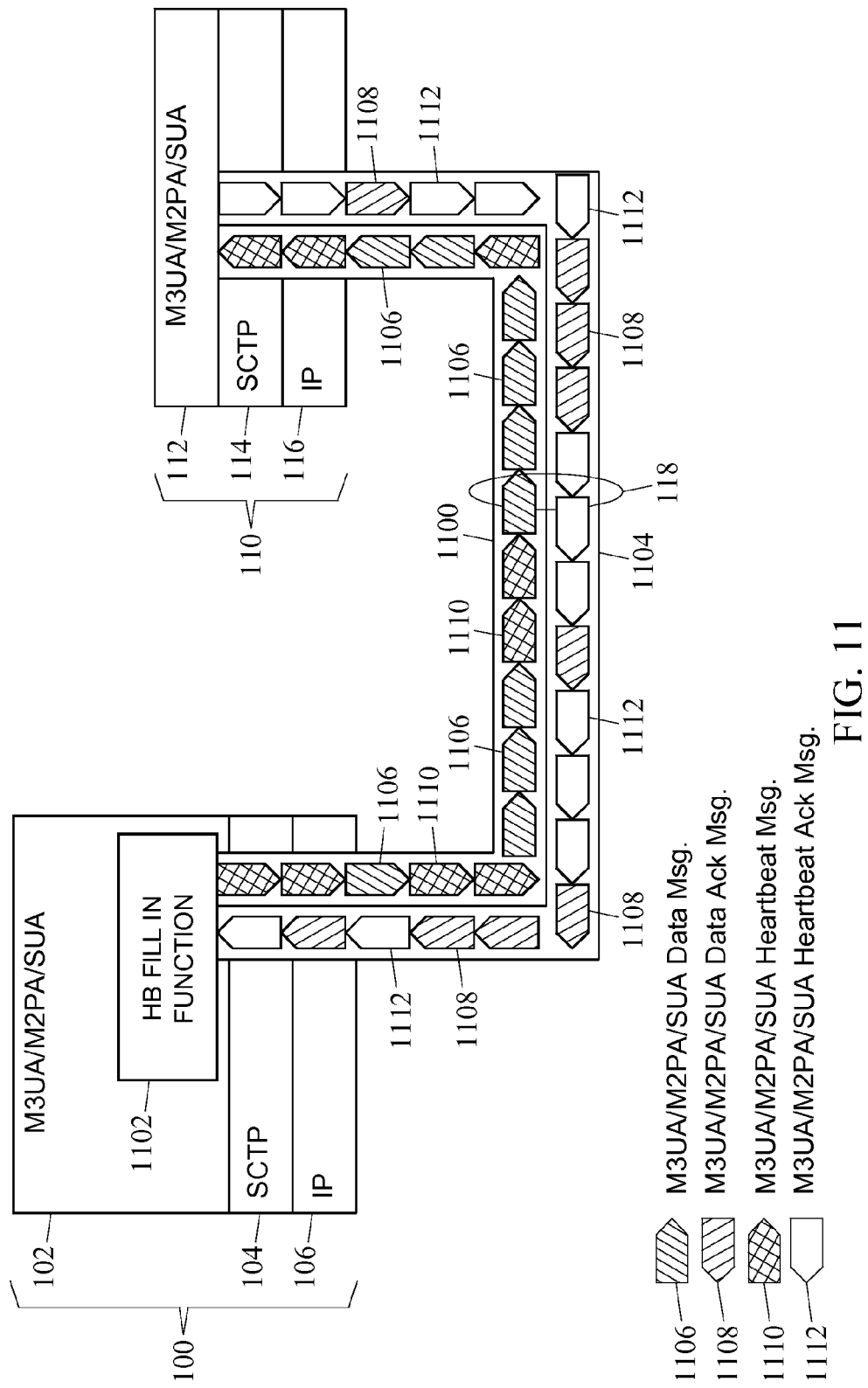
FIG. 11 is a block diagram illustrating an exemplary IP link for performing link proving according to an embodiment of the subject matter described herein.

FIG. 11 is a block diagram illustrating an exemplary IP link for performing link proving according to an embodiment of the subject matter described herein. In FIG. 11, IP communications link 118 may always be loaded to its rated capacity by sending a plurality of heartbeat fill in (HFI) messages at a rate sufficient to fill any capacity that is unused by other traffic. In this way, the embodiment shown in FIG. 11 may provide for simulating SS7 link status signaling units (LSSUs) in an IP network. Specifically, HFI message stream 1100 may be generated by HFI function 1102 and used to monitor link status on a continuous basis and/or generate a notification regarding link status to a system operator.

For example, M3UA/M2PA/SUA layer 102 may generate one or more data messages 1106 for transmission to destination stack 110. HB fill in function 1102 may insert additional heartbeat messages 1110 in order to fill the remaining capacity of link 118. In response, M3UA/M2PA/SUA layer 112 may generate and return one or more corresponding data acknowledgement messages 1108 and heartbeat acknowledgement messages 1112.

It is appreciated that in addition to the single-homed embodiment illustrated in FIG. 11 that the use of HFI messages as described above may be implemented in a multi-homed environment without departing from the scope of the subject matter disclosed herein. It is further appreciated that the subject matter described herein for performing link proving for an IP link may be enabled or disabled based on user input. Furthermore, variables associated with performing the link proving described herein may be configurable. These variables may include the duration of link proving (i.e. the link proving period), the size of BEAT messages, the rate at which BEAT messages are sent during link proving, the maximum acceptable RTT, and the maximum acceptable SCTP packet retransmission percentage.

One advantage of the subject matter described herein is that no changes are required to any of the protocols involved, such as the M3UA, SUA, or SCTP protocols. Because messages included within each IP protocol are used for link proving, a signaling gateway implementing the subject matter described above may easily interoperate with existing network communications hardware and software.

Figure 12:
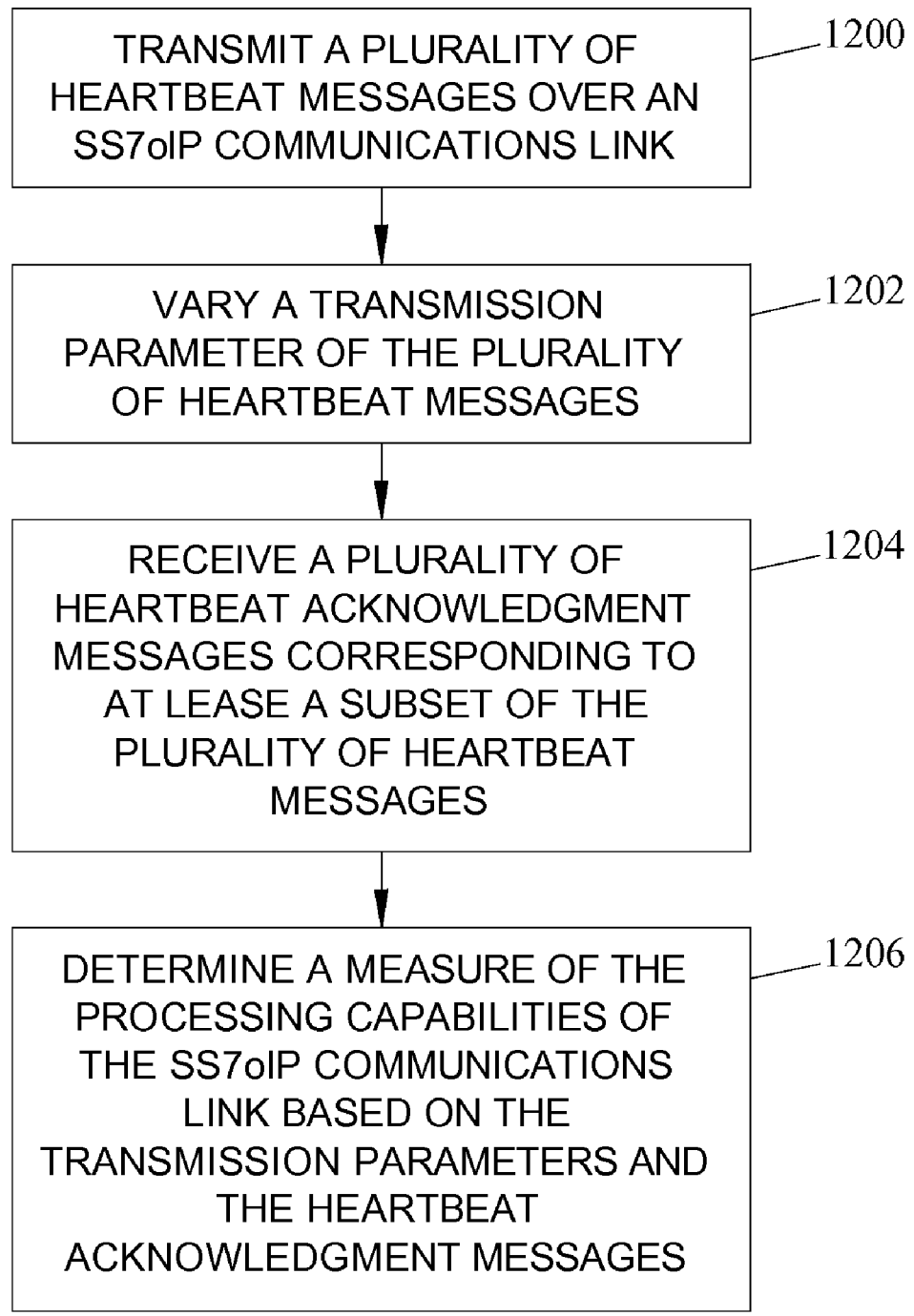
FIG. 12 is a flow chart of exemplary steps for performing link proving for an IP link according to an embodiment of the subject matter described herein.

FIG. 12 is a flow chart illustrating an exemplary process for effecting link proving on an IP communications link according to an embodiment of the subject matter described herein. Referring to FIG. 12, in block 1200, one or more transmission parameters associated with a plurality of heartbeat messages is configured. For example, a plurality of heartbeat messages may be configured to include a header portion designating one or more connections to a destination network node, and a payload portion including one or more user-configurable values for determining link performance. The header portion may include an IP address of the destination node, an IP address of a local NIC, an SCTP association identifier, one or more path identifiers, and/or a number of paths within an SCTP association. The payload portion may include, for example, a sequence number, a checksum, a timestamp, bit padding, or other information suitable for determining link performance. Additionally, the plurality of heartbeat messages may be configured to be sent at an initial rate that may be increased or decreased over time and may further be configured to include a user-configurable message size or variety of message sizes.

In block 1202, the plurality of heartbeat messages are sent over an IP link based on the one or more transmission parameters. For example, the plurality of messages may be sent to a destination link proving function via a first path within a first SCTP association at a first rate and including a first message size. As these parameters are adjusted according to block 1200 described above, the transmission of the heartbeat messages changes accordingly.

In block 1204, a plurality of heartbeat acknowledgement messages are received corresponding to at least a subset of the plurality of heartbeat messages. According to the M3UA specification, an appropriate function receiving a heartbeat message automatically responds by generating and returning a heartbeat acknowledgement message that includes the same payload that was included in the received heartbeat message. Therefore, in response to transmitting a plurality of heartbeat messages, a corresponding plurality of heartbeat acknowledgement messages are received, where each heartbeat acknowledgement message contains the same payload as that included in its corresponding heartbeat message.

In block 1206, a measure of the processing capabilities of the IP based link is determined based on the heartbeat messages and the heartbeat acknowledgement messages. For example, a RTT for a message traversing the link may be determined based on an examination of a timestamp included within a BEAT/BEATACK message pair. In one embodiment, if the RTT exceeds a threshold determined by the system operator, the link may fail to be proved and a notification may be sent to the operator. As described in greater detail above, multiple transmission parameters may be included within BEAT messages and therefore a variety of transmission performance measures may be determined. It is appreciated that because a plurality of BEAT messages are transmitted over a period of time that the determination of the processing capabilities of an IP link may also be made over a period of time and therefore may more accurately assess link health during the link proving period.

Figure 13:
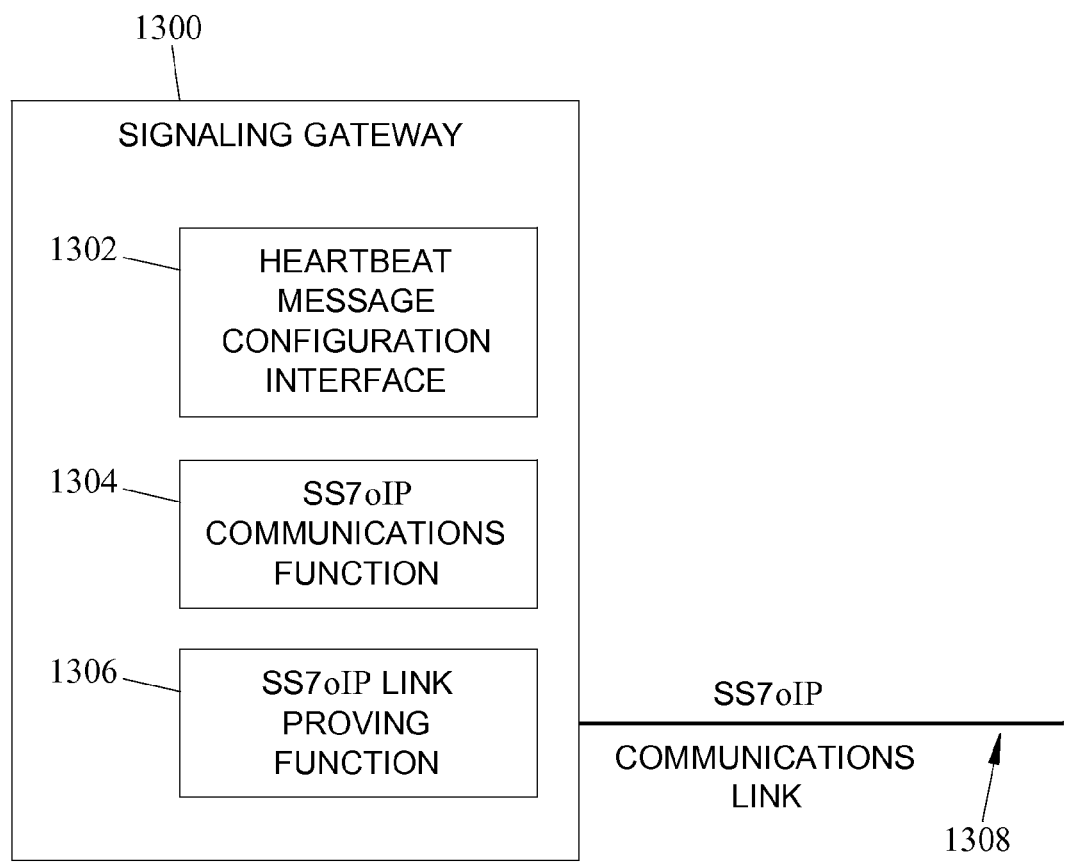
FIG. 13 is a block diagram illustrating an exemplary signaling gateway for performing link proving for an IP link according to an embodiment of the subject matter described herein.

FIG. 13 is a block diagram illustrating an exemplary signaling gateway for performing link proving for an IP link according to an embodiment of the subject matter described herein. Referring to FIG. 13, signaling gateway 1300 may include a heartbeat message configuration interface 1302 for varying a transmission parameter of heartbeat messages to be transmitted over an IP link. For example, heartbeat message configuration interface 1302 may vary the size of heartbeat messages, the transmission rate of heartbeat message, or a combination of both. Other transmission parameters may also be varied without departing from the scope of the subject matter described herein.

IP communications function 1304 may transmit the plurality of heartbeat messages over IP link 1308, wherein the transmission parameters in the heartbeat messages vary according to settings received via configuration interface 1302. IP link proving function 1306 may determine processing capabilities of IP link 1308 based on the heartbeat messages and the heartbeat acknowledgement messages. For example, heartbeat messages may be transmitted across IP link 1308 at a first rate and a round trip time measured based on a timestamp included in the payload of the heartbeat and heartbeat acknowledgement messages. The transmission rate of subsequent heartbeat message may be increased until a maximum transmission rate of IP link 1308 is determined.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is
1. A method for proving an Internet Protocol (IP) communications link, the method comprising:
    transmitting a plurality of heartbeat messages over an IP communications link;
    varying, during a same link-proving period, a transmission parameter of the plurality of heartbeat messages, wherein varying a transmission parameter includes varying a transmission rate and a payload size associated with the plurality of heartbeat messages to attempt to prove the IP communication link with different combinations of transmission rate and payload size;
    receiving a plurality of heartbeat acknowledgement messages corresponding to at least a subset of the plurality of heartbeat messages; and
    determining a measure of the processing capabilities of the IP communications link based on the transmission parameters and the heartbeat acknowledgement messages.

2. The method of claim 1 wherein transmitting a plurality of heartbeat messages includes transmitting at least one of a signaling system 7 over IP (SS7oIP) message, a session initiation protocol (SIP) message, an IP multimedia subsystem (IMS) message, and a next generation network (NGN) message.

3. The method of claim 1 wherein determining a measure of link processing capabilities includes determining a change in round trip time (RTT).

4. The method of claim 1 wherein determining a measure of link processing capabilities includes determining a transmission rate of the link.

5. The method of claim 1 wherein varying a transmission parameter includes setting payload sizes in the heartbeat messages to at least two of a minimum expected payload size, a maximum expected payload size, and an average expected payload size.

6. The method of claim 1 wherein sending a plurality of heartbeat messages includes sending at least one of a message transfer part three user adaptation (M3UA) heartbeat message, a message transfer part two user peer-to-peer adaptation (M2PA) heartbeat message, and a signaling connection and control part (SCCP) user adaptation (SUA) heartbeat message.

7. The method of claim 1 wherein determining a measure of the processing capabilities of the IP communications link includes determining at least one of a maximum round trip time, an indication of whether a heartbeat message sender's receiving window size is increasing or decreasing, a total number of messages retransmitted during the link-proving period, and a rate of message retransmissions during the link-proving period.

8. The method of claim 1 comprising:
    determining whether the measure of processing capabilities of the IP communications link meets a minimum requirement to bring the link into service; and
    bringing the link into service in response to determining that the measure of the processing capabilities meets the minimum requirement.

9. A method for proving a multi-homed Internet Protocol (IP) communications link, the method comprising:
    for each of a plurality of communications paths within a multi-homed stream control transmission protocol (SCTP) association:
    transmitting a plurality of heartbeat messages over the communications path within the multi-homed stream control transmission protocol (SCTP) association;

varying, during a same link-proving period, a transmission parameter of the plurality of heartbeat messages, wherein varying a transmission parameter includes varying a transmission rate and a payload size associated with the plurality of heartbeat messages to attempt to prove the communications path with different combinations of transmission rate and payload size;

receiving a plurality of heartbeat acknowledgement messages corresponding to at least a subset of the plurality of heartbeat messages; and determining a measure of the processing capabilities of the communications path based on the transmission parameters and the heartbeat acknowledgement messages.

10. The method of claim 9 wherein transmitting the first and second sets of heartbeat messages includes originating the heartbeat messages in an SCTP layer.

11. The method of claim 9 wherein transmitting the first and second sets of heartbeat messages includes originating the heartbeat messages in an adaptation layer.

12. A signaling gateway for proving an Internet Protocol (IP) communications link, the signaling gateway comprising:

a heartbeat message configuration interface for varying at least one transmission parameter of a plurality of heartbeat messages to be transmitted over an IP communications link, wherein varying a transmission parameter includes varying a transmission rate and a payload size associated with the plurality of heartbeat messages to attempt to prove the IP communications link with different combinations of transmission rate and payload size;

an IP communications function, embodied in a memory, for transmitting the plurality of heartbeat messages over the IP link, wherein the transmission parameters in the heartbeat messages vary during a same link-proving period according to settings received via the configuration interface; and an IP link proving function, embodied in a memory, for determining processing capabilities of the IP based link based on the plurality of heartbeat messages and heartbeat acknowledgement messages associated with the plurality of heartbeat messages.

13. The signaling gateway of claim 12 wherein the IP communications function is configured to transmit at least one of a plurality of signaling system 7 over IP (SS7oIP) messages, a plurality of session initiation protocol (SIP) messages, a plurality of IP multimedia subsystem (IMS) messages, and a plurality of next generation network (NGN) messages.

14. The signaling gateway of claim 12 wherein the IP link proving function is configured to determine a change in round trip time (RTT).

15. The signaling gateway of claim 12 wherein the IP link proving function is configured to determine a transmission rate of the link.

16. The signaling gateway of claim 12 wherein varying a transmission parameter includes setting payload sizes in the heartbeat messages to at least two of a minimum expected payload size, a maximum expected payload size, and an average expected payload size.

17. The signaling gateway of claim 12 wherein the IP communications function is configured to send at least one of a message transfer part three user adaptation (M3UA) heartbeat message, a message transfer part two user peer-to-peer adaptation (M2PA) heartbeat message, and a signaling connection and control part (SCCP) user adaptation (SUA) heartbeat message.

18. The signaling gateway of claim 12 wherein the IP link proving function is configured to determine at least one of a maximum round trip time, an indication of whether a heartbeat message sender's receiving window size is increasing or decreasing, a total number of messages retransmitted during the link-proving period, and a rate of message retransmissions during the link-proving period.

19. The signaling gateway of claim 12 wherein the IP link proving function is configured to:

determine a measure of minimum processing capabilities required to bring the link into service;

determine whether the processing capabilities of the IP based link satisfy the measure; and bring the link into service in response to determining that the processing capabilities satisfy the measure.

20. A signaling gateway for proving a multi-homed Internet Protocol (IP) communications link, the signaling gateway comprising:

an IP communications function, embodied in a memory, for:

for each of a plurality of communications paths within a multi-homed stream control transmission protocol (SCTP) association:

transmitting a plurality of heartbeat messages over the communications path within the multi-homed stream control transmission protocol (SCTP) association;

varying, during a same link-proving period, a transmission parameter of the plurality of heartbeat messages, wherein varying a transmission parameter includes varying a transmission rate and a payload size associated with the plurality of heartbeat messages to attempt to prove the communications path with different combinations of transmission rate and payload size; and receiving a plurality of heartbeat acknowledgement messages corresponding to at least a subset of the plurality of heartbeat messages; and an IP link proving function, embodied in a memory, for determining a measure of processing capabilities of each communications path based on the plurality of heartbeat messages and heartbeat acknowledgement messages for a given path.

21. The signaling gateway of claim 20 wherein the IP communications function is configured to originate the plurality of heartbeat messages in an SCTP layer.

22. The signaling gateway of claim 20 wherein the IP communications function is configured to originate the plurality of heartbeat messages in an adaptation layer.

23. A computer program product comprising computer executable instructions embodied in a non-transitory computer readable medium for performing steps comprising:

transmitting a plurality of heartbeat messages over an Internet Protocol (IP) communications link;

varying, during a same link-proving period, a transmission parameter of the plurality of heartbeat messages, wherein varying a transmission parameter includes varying a transmission rate and a payload size associated with the plurality of heartbeat messages to attempt to prove the IP communications link with different combinations of transmission rate and payload size;

receiving a plurality of heartbeat acknowledgement messages corresponding to at least a subset of the plurality of heartbeat messages; and determining a measure of processing capabilities of the IP communications link based on the transmission parameters and the heartbeat acknowledgement messages.

* * * * *